United States Patent [19]

Shinagawa

[11] Patent Number: 5,200,600
[45] Date of Patent: Apr. 6, 1993

[54] IC CARD AND METHOD FOR WRITING INFORMATION THEREIN

[75] Inventor: Toru Shinagawa, Toride, Japan

[73] Assignee: Hitachi Maxell, Ltd., Osaka, Japan

[21] Appl. No.: 925,416

[22] Filed: Aug. 10, 1992

Related U.S. Application Data

[63] Continuation of Ser. No. 398,474, Aug. 25, 1989, abandoned.

[30] Foreign Application Priority Data

Aug. 29, 1988 [JP] Japan .................. 63-214522

[51] Int. Cl.$^5$ .......................................... G06K 19/06
[52] U.S. Cl. ...................... 235/492; 235/380; 235/487
[58] Field of Search .............. 235/380, 487, 492

[56] References Cited

U.S. PATENT DOCUMENTS

| | | |
|---|---|---|
| 4,001,550 | 1/1977 | Schatz . |
| 4,211,919 | 7/1980 | Ugon . |
| 4,575,621 | 3/1986 | Dreifus .................. 235/492 |
| 4,837,134 | 6/1989 | Bouldin et al. . |
| 4,845,717 | 7/1989 | Lijing .................. 235/379 |
| 4,868,376 | 9/1989 | Lessin et al. .................. 235/492 |
| 4,874,935 | 10/1989 | Younger .................. 235/492 |

FOREIGN PATENT DOCUMENTS

| | | |
|---|---|---|
| 213534 | 11/1987 | European Pat. Off. . |
| 251619 | 1/1988 | European Pat. Off. . |
| 275510 | 7/1988 | European Pat. Off. . |
| 2591006 | 11/1986 | France . |
| 2609175 | 12/1987 | France . |
| 61-211788 | 9/1986 | Japan . |
| 8707062 | 11/1987 | PCT Int'l Appl. . |

OTHER PUBLICATIONS

"The Technology of Smartcards and their Applications" by Daniel Artusi, 8079 Electro, 86 and Mini/Micro Northeast 11 (1986) Conference Record, Los Angeles, Calif., USA.

Primary Examiner—Harold Pitts

[57] ABSTRACT

An IC card storing therein information transmitted from an external terminal unit includes a processor, an interface, a first memory for storing a system program, a second memory for storing an application program, and a third memory for storing processed data. The second memory includes a latch circuit for temporarily latching data of a plurality of bytes transmitted to the IC card from the external terminal unit, and an electrically erasable and programmable memory for storing data of a predetermined number of bytes when the data is transferred to the latch circuit.

12 Claims, 4 Drawing Sheets

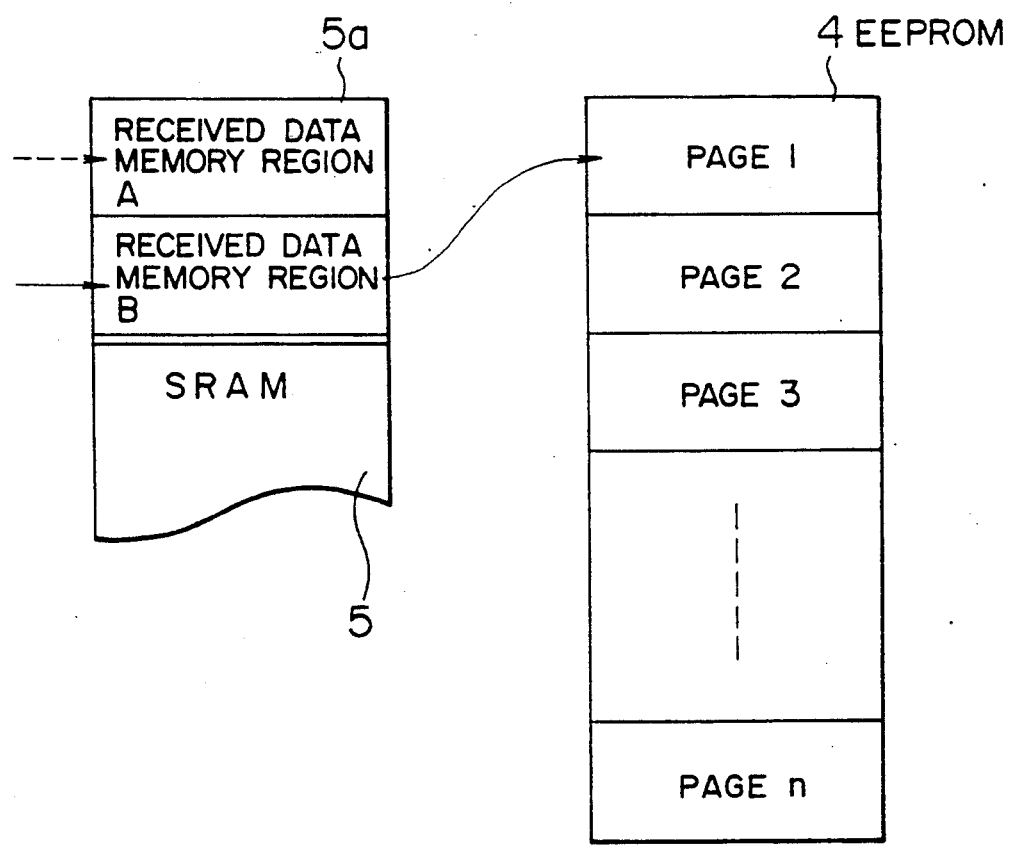
F I G. 3

PRIOR ART (STATE TRANSITION IN PRIOR ART EEPROM)

FIG. 4b (STATE TRANSITION IN EEPROM)

F I G. 5
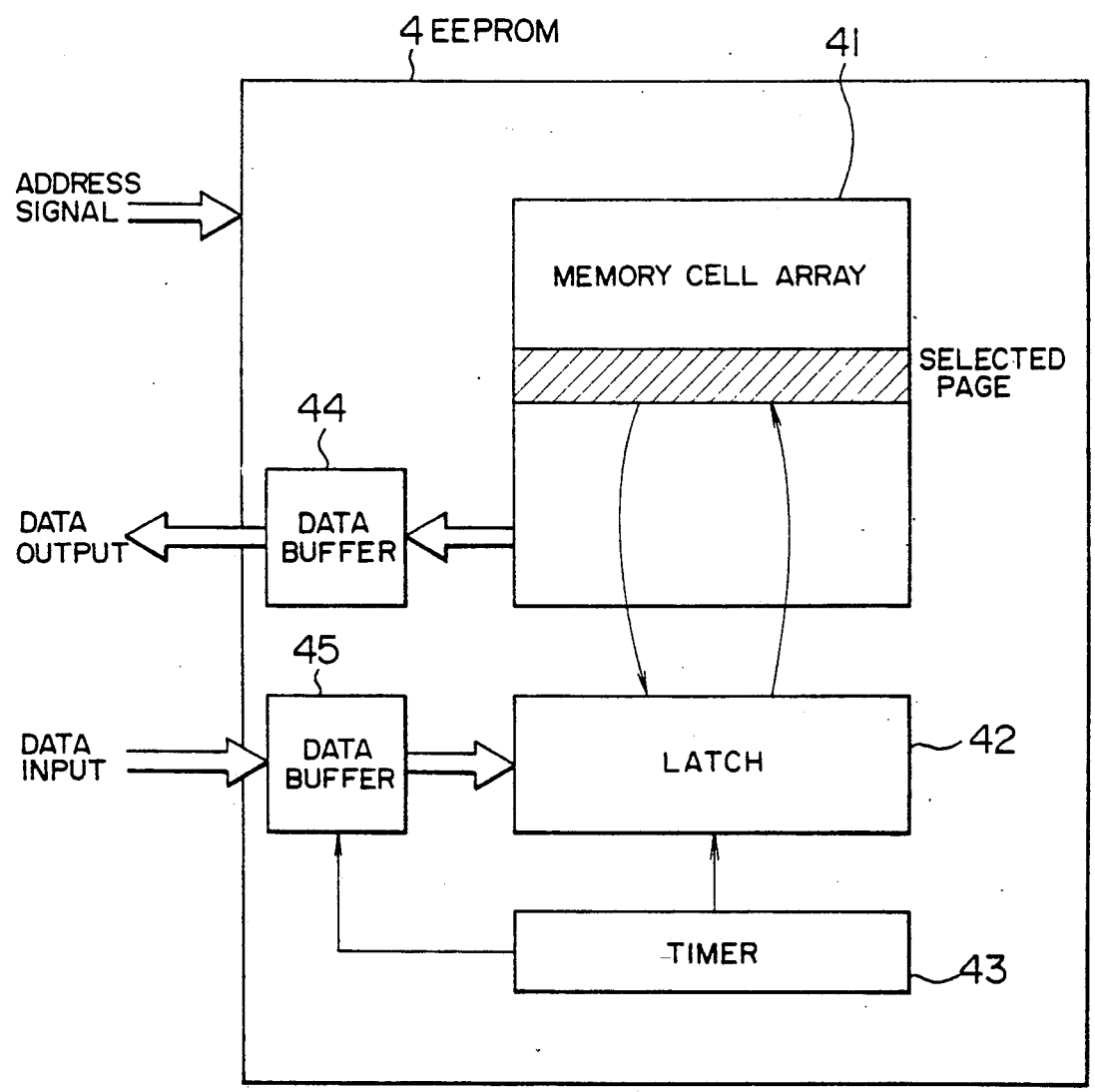

IC CARD AND METHOD FOR WRITING INFORMATION THEREIN

This application is a continuation of application Ser. No. 07/398,474 filed on Aug. 25, 1989, now abandoned.

BACKGROUND OF THE INVENTION

This invention relates to an IC card and a method for writing information therein. More particularly, this invention relates to an IC card and a method for writing information in the IC card, so that an information processing program, etc. can be effectively written by down-loading in an electrically erasable and programmable non-volatile memory (an EEPROM) provided for storing such a program, etc.

In a conventional IC card used in the past, a processing program for a microprocessor was stored in a mask ROM, and the contents of the processing program could not be changed. Recently, an EEPROM is used as a program memory in an IC card, so that a program can be written later in the memory, and its contents can be changed later.

In the modern IC card described above, various registered data such as various kinds of ID information (identification information or collation information) are written later in the EEPROM, and, in addition to such a memory, a static RAM (an SRAM) or the like is incorporated as a work memory for temporarily storing data.

While the SRAM is generally advantageous over the EEPROM in that the time required for writing data (a write time) is relatively short, it has the defect that stored data becomes volatile when the power supply is cut off. On the other hand, although the EEPROM can be used as a programmable non-volatile memory, it has such a defect that, while the write time required for writing data of 1 byte in the SRAM is only in the order of microsecond, a longer write time in the order of a millisecond is required for writing data of 1 byte in the EEPROM.

Therefore, it is a prior art practice that, in the case of writing a large amount of data in the EEPROM, the data is written once in the SRAM and then written in the EEPROM. However, because a considerably large capacity is not allotted to the SRAM in the IC card, the region of the SRAM utilized as a communication buffer is limited in size, and a limited amount of data can only be transmitted at a time. Thus, it is the present status that a large amount of data is transmitted and written in the SRAM in a relation divided into groups each including a small amount of data.

Consequently, write data including duplications of data such as an initiation code, a command, an identification code, a termination code, etc. must be transmitted a plurality of times, resulting in a troublesome procedure data writing and transmission. Further, because serial processing including data reception, data writing and data confirmation is commonly executed for writing data in the IC card, division of data into a plurality of groups as described above obstructs the desired high-speed data writing.

SUMMARY OF THE INVENTION

With a view to solve such prior art problems, it is an object of the present invention to provide a method permitting high-speed writing of information in an IC card.

Another object of the present invention is to provide a method for writing information in an IC card so that a large amount of data can be continuously written in the IC card thereby improving the performance of data writing.

According to the present invention which attains the above objects, an IC card includes two kinds of memories, that is, a memory such as an SRAM having a data write time shorter than a data transmission time and a memory such as an EEPROM with a latch circuit, in which a data write time for writing externally transmitted data is short but a data write time for writing internally transferred data is long. Received data memory regions for storing data to be transmitted, within the data write time, to the memory having the long data write time are provided on the memory having the short data write time, and the size of those received data memory regions is selected to be p times (p: an integer) as large as the unit length of information accessed by the memory having the long internal data write time.

According to one aspect of the present invention, there is provided an IC card which comprises a processor, a first non-volatile memory means for storing a system program required for the operation of the processor, a programmable second non-volatile memory means for storing an application program, registered data or the like, a third memory means in the form of a programmable non-volatile or volatile memory for storing various kinds of processed data, and an interface receiving and transmitting data from and to an external terminal unit. In the IC card, the second memory means includes specified memory locations to store information whose unit length is n bytes (n: an integer larger than and including 2) and has an external information write time $t_1$ and an internal information write time $t_2$ ($t_2 > t_1$) required for writing information of unit length. The third memory means includes a plurality of memory regions for storing information of the unit length in each of them and has an information write time $t_3$ required for writing data of m bytes (m: an integer smaller than n) in one of the plural memory regions. Further, the sum of the times $t_3$ and $t_1$ is selected to be equal to or shorter than the time required for receiving the data of m bytes. The total time $t_4$ required for receiving the information of the unit length is given by the relation $t_4 = > t_1 + t_2 + t_3$. The information writing method comprises the steps of successively writing data of m bytes in one of the plural memory regions of the third memory means by the processor according to the system program or application program in response to the reception of the data of m bytes among information transmitted from the external terminal unit. Further, when the information of unit length is already written in at least one of the plural memory regions of the third memory means, and the transmitted information of m bytes to be written is being received, reading out the information of unit length stored earliest of all in the memory regions of the third memory means and writing the same in the second memory means.

In the IC card according to the present invention, the second memory means is in the form of, for example, a high-speed operable EEPROM having a built-in latch circuit capable of latching information of a fixed unit length of, for example, 32 bytes or 64 bytes, and the third memory means is in the form of an SRAM having a plurality of received information memory regions. The unit information length described above will be referred to hereinafter as one page as required. When information having lengths, each of which is equal to the unit length described above, is transmitted from the external terminal unit to be latched and then written in the EEPROM, the information of unit length is stored once in each of the plural memory regions of the SRAM and is then transferred to the EEPROM. In the present invention, write data transmitted from the external terminal unit is written on the SRAM in parallel relation with writing of data from the SRAM into the EEPROM, and such an operation is completed within the one-page transfer time. Therefore, writing of data in the EEPROM can be executed during transmission of data from the external terminal unit, and the speed of transmitted data writing can be improved.

BRIEF DESCRIPTION OF THE DRAWINGS

FIG. 3 shows the manner of writing data from the SRAM into the EEPROM shown in FIG. 1.

FIGS. 4a and 4b show how the state of the operation mode makes transition in a prior art EEPROM and the EEPROM used in the present invention, respectively.

FIG. 5 shows the internal structure of the EEPROM shown in FIG. 1.

DESCRIPTION OF THE PREFERRED EMBODIMENTS

Preferred embodiments of the information writing method according to the present invention will now be described in detail with reference to the drawings.

Figure 1:
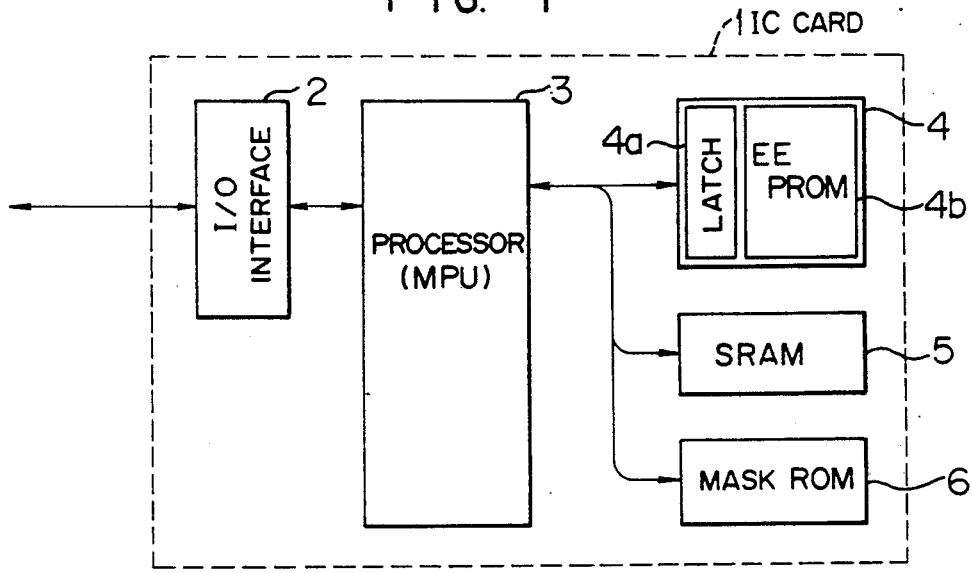
FIG. 1 is a block diagram of an IC card to which a preferred embodiment of the information writing method according to the present invention is applied.
Figure 2:
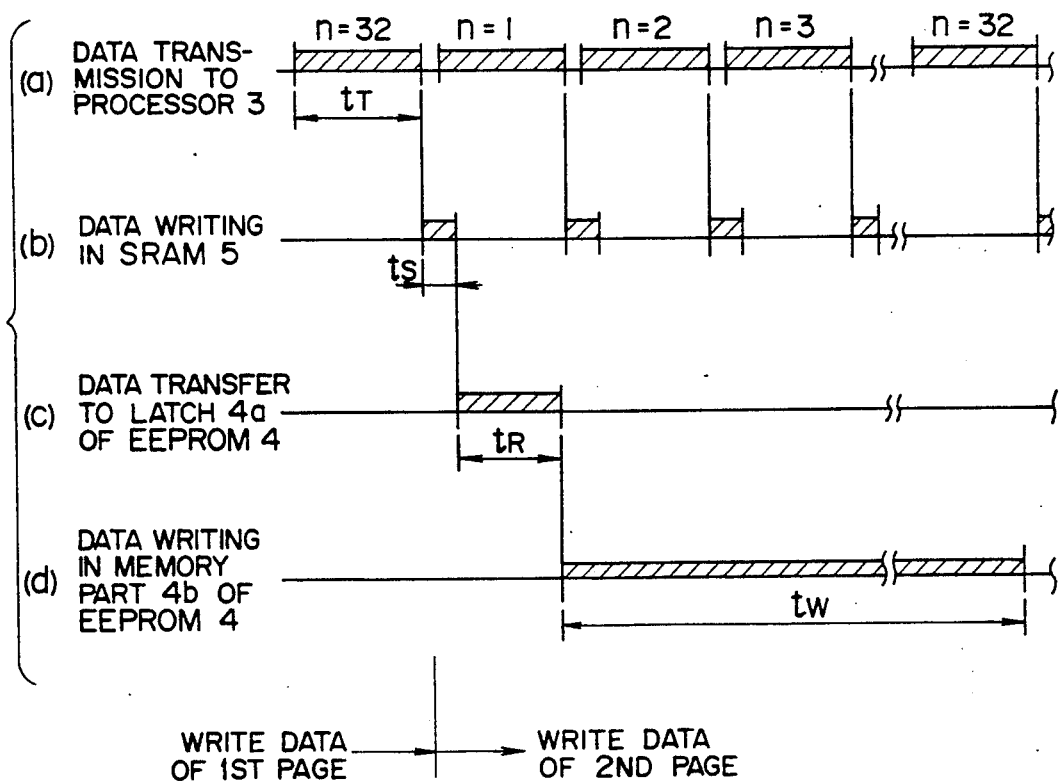
FIG. 2 is a timing chart showing the timing of writing data in the IC card.

FIG. 1 is a block diagram of an IC card to which an embodiment of the information writing method according to the present invention is applied, FIG. 2 is a timing chart showing the timing of writing data in the IC card, and FIG. 3 shows the manner of writing data from the SRAM into the EEPROM shown in FIG. 1.

Referring to FIG. 1, the reference numeral 1 designates the IC card which includes a mask ROM 6 storing a system program therein, an EEPROM 4 storing an application program or registered data or the like therein, an SRAM 5 acting as a communication buffer and a work memory, an input/output interface 2 for receiving and transmitting signals from and to an external terminal unit (not shown), and a microprocessor (an MPU) 3 controlling the units described above.

The EEPROM 4 is formed on one chip and includes a latch circuit 4a capable of high-speed latching of information units each having a length of, for example, 32 bytes, and a memory part 4b. As shown in FIG. 2, externally transmitted data having an information unit length (corresponding to 1 page, that is, 32 bytes herein) can be latched by the latch circuit 4a at a high speed of about 200 nsec/byte within a data write time $T_R$, and the latched data is then written in the memory part 4b of the EEPROM 4 within a data write time $t_w$ of about 15 msec/page (1 page=32 bytes). This write time $t_w$ is quite short when compared to a write time of about 15 msec/byte in an EEPROM incorporated in a conventional IC card.

Figure 4A:
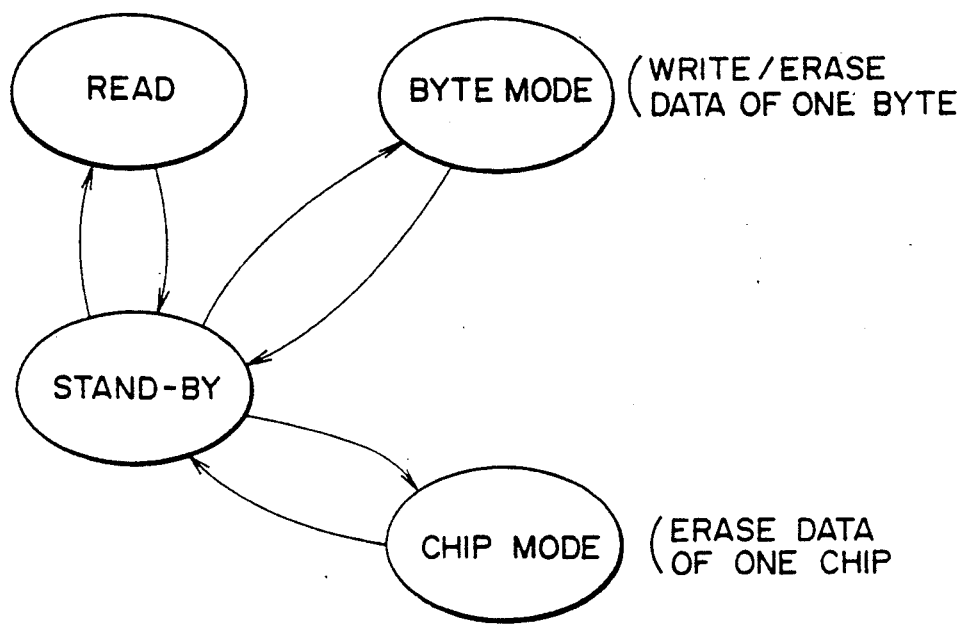
Figure 4A:
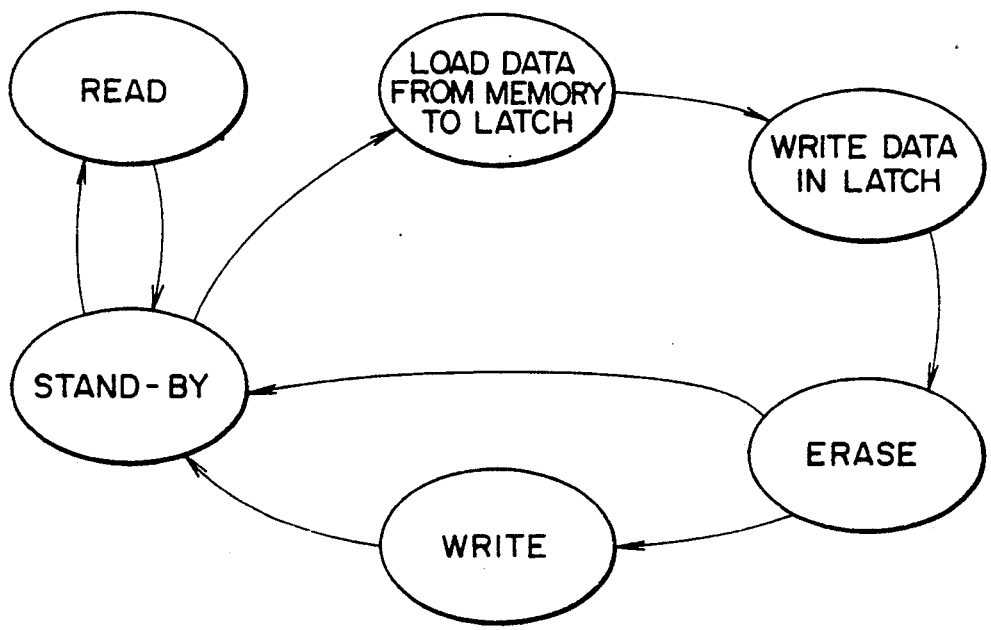

FIG. 4a shows how transition occurs in the state of the operation mode of the EEPROM in the conventional IC card, and FIG. 4b shows how transition occurs in the state of the operation mode of the high-speed operable EEPROM 4 in the IC card shown in FIG. 1.

FIG. 5 shows one form of the internal structure of the high-speed operable EEPROM 4 shown in FIG. 1. The state of the EEPROM is determined by the combination of a chip select signal CE, a read enable signal OE and a write enable signal $W_E$ applied to the EEPROM by way of three signal lines respectively. In the case of the EEPROM incorporated in the conventional IC card, one byte is the unit of data written, read and/or erased, and data stored on one chip can be erased as a unit. On the other hand, in the case of the high-speed operable EEPROM 4 which includes a memory cell array 41, a latch 42, a timer 43, an output data buffer 44 and an input data buffer 45 as shown in FIG. 5, one byte is also the unit of data written, read and/or erased, and data belonging to one page can be written as a unit. The page is determined by the length of the data latch 42 in the EEPROM 4 and is 32 bytes in the embodiment of the present invention. By the provision of this data latch 42, data can be written in the EEPROM 4 within a time equivalent to that required for writing data in the SRAM 5. The EEPROM incorporated in the conventional IC card does not include a data latch such as the data latch 42 capable of latching data of one page, and its data writing speed is lower than that of the SRAM.

The state transition in a high-speed operable EEPROM 4 incorporated in the IC card 1 can be classified into a read mode and a write/erase mode. The EEPROM 4 starts to operate in its write/erase mode in response to the application of a chip select signal $C_E$ together with a write enable signal $W_E$. First, data written already on a page selected by the address signal is loaded from the memory cell array 41 to the data latch 42. Then, data to be altered and/or written is externally latched by the data latch 42. When the number of bytes of the data to be written is smaller than 32 bytes, the data latched already is replaced on the data latch 42 by the data to be altered only. After the data is latched by the data latch 42, the EEPROM 4 starts to operate in its write/erase mode in a predetermined time determined by the timer 43. First, data having the length of one page is erased on the memory cell array 41, and the data latched in the data latch 42 is newly written on the memory cell array 41. In the case of the erase mode, external data latching in the data latch 42 and writing of latched data from the data latch 42 onto the memory cell array 41 are not carried out. In this case, the time actually required for writing data corresponding to one page on the memory cell array 41 is substantially equivalent to that required for writing data corresponding to one byte in the EEPROM incorporated in the conventional IC card. By the provision of the data latch 42, the time required for writing externally transmitted data in the EEPROM 4 can be made equivalent to that required for data writing in the SRAM, and data of one page (for example, 32 bytes) can be written in the EEPROM 4 within a write time equivalent to that required hitherto for writing data of one byte. Thus, data can be written at a high speed.

Referring to FIG. 3, the SRAM 5 includes a communication buffer 5a which is divided into, for example, two received data memory regions A and B. Each of these regions A and B has a capacity which can store information having a length of 32 bytes, similar to the capacity of the data latch 42 which can latch information of one page.

A data writing procedure, when one page corresponds to 32 bytes, will now be described with reference to FIGS. 2 and 3. In the sequence of steps of processing which will be described now, it is basically supposed that a data write program included in a system program stored in the mask ROM 6 or an application program stored in the EEPROM 4 is activated in response to a data write command applied from the external terminal unit, and the MPU 3 executes the data write program. The I/O interface 2 or the MPU 3 includes a 1-byte data register or the like therein, and the MPU 3 receiving data, whose unit is one byte, writes such data in the SRAM 5. Thus, data reception and data writing are independently carried out in parallel relation to each other.

The application program referred to in this specification differs from the system program used for the basic control purpose and designates a processing program prepared for execution of a specific function according to the specification of the IC card 1, or designates an operation program run for the purpose of processing as described above.

When data to be written is transferred from the external terminal unit to the IC card 1 together with or separately from the data write command, the transferred data is written in the EEPROM 4 in the form of a bulk of 32 bytes corresponding to one page as previously described. In FIG. 2, the symbol n (=1, ..., 32) designates the order of receiving data bytes transferred from the external terminal unit. Suppose that the symbols $t_T$, $t_S$, $t_R$ and $t_W$ designate the time required for transmitting data of one byte, the time required for writing data of one byte in the SRAM 5, the time required for latching data of one page in the latch circuit 4a of the EEPROM 4, and the time required for writing data of one page from the latch circuit 4a into the memory part 4b of the EEPROM 4, respectively. Then, these times $t_T$, $t_S$, $t_R$ and $t_W$ have relationships satisfying the following conditions:

$$t_T > t_S + t_R \quad (1)$$

$$32 \cdot t_T > = t_S + t_R + t_W \quad (2)$$

where $32 \cdot t_T$ designates the total time required for the MPU 3 to receive data of one page (that is, the information of unit length).

In the sequence of the write mode, data of one byte transferred from the external terminal unit is received by the MPU 3 through the I/O interface 2, and the received data is written once in the SRAM 5. The above operation is repeated until data of one page (=32 bytes) is received. After the data of one page (=32 bytes), which is the unit of information stored in the EEPROM 4, is completely received by the MPU 3, the finally received data of one byte in the data of one page starts to be written in the SRAM 5. Further, while data of first one byte in the next page is being received, the data of one byte in the preceding page received previously is completely written in the SRAM 5. After the data of one byte is completely written in the SRAM 5 but before data of next one byte is completely received by the MPU 3, the data of one page received already is read out from the SRAM 5 and latched by the latch circuit 4a of the EEPROM 4. Then, data of one byte received next by the MPU 3 is written in the SRAM 5.

In the EEPROM 4 in which the externally transmitted data of one page is written by the MPU 3, the data is completely latched in the latch 4a of the EEPROM 4. Then, independently of the operation of the MPU 3, the data latched in the latch circuit 4a is written in the individual memory cells of the memory part 4b of the EEPROM 4 in the manner as described already with reference to FIG. 5. At the end of the write time $t_W$, the data of one page is completely written in the memory part 4b of the EEPROM 4.

While the data of one page is being written in the memory part 4b of the EEPROM 4, the MPU 3 continues, in the period of the write time $t_W$, to write received data of next one page in one of the received data memory regions A and B of the SRAM 5. This writing operation is completed simultaneously with or after the end of the writing operation of the data of one page in the memory part 4b of the EEPROM 4, as will be apparent from the expression (2). The data of one page, stored previously in the received data memory region A or B of the SRAM 5, is then written in the EEPROM 4 again, while the MPU 3 is receiving data of one byte transmitted next from the external terminal unit. By the repetition of the operations described above, received data of one page after another is successively written in the memory part 4b of the EEPROM 4.

The sequence described above is more concretely shown in FIG. 2. It is supposed that received data transmitted from the external terminal unit is written in the received data memory region B of the SRAM 5, as indicated by the solid line in FIG. 3. Referring to FIG. 2, after data of final one byte in data of one page is received to complete reception of the data of one page (=32 bytes), the data of a final one byte is immediately written in the received data memory region B of the SRAM 5 to complete writing of all the received data of one page in the received data memory region B of the SRAM 5. The manner of processing in this case will be described in further detail.

In a predetermined dead time (which is determined by the mode of data transfer and the processing performance of the MPU 3 and which is almost unnecessary when data reception and data writing can be simultaneously carried out) after the MPU 3 receives transmitted data of final one byte (n=32) in data of preceding one page, the MPU 3 starts to receive transmitted data of first one byte (n=1) in data of next one page, and, while receiving the data of first one byte (n=1), the received data of final one byte (n=32) in the data of the preceding one page is written in the received data memory region B of the SRAM 5. Immediately thereafter, the received data of one page stored already in the received data memory region B of the SRAM 5 is read out and written in the EEPROM 4. Then, after the transmitted data of first one byte (n=1) in next one page is completely received, the above data is written and stored now in a first location (a position corresponding to n=1) of the received data memory region A of the SRAM 5, as indicated by the dotted line in FIG. 3. In this manner, received data of one byte after another is successively stored in the first and succeeding locations of the received data memory region A of the SRAM 5.

In this case, the data of one page is latched in the latch circuit 4a of the EEPROM 4 within the short latch time $t_R$, as shown in FIG. 2. The latched data of one page is then written in the individual memory cells of the memory part 4b of the EEPROM 4 within the internal data write time $t_W$, as shown in FIG. 2. In the meantime, the MPU 3, utilizing the received data memory region A, writes successively next and succeeding received data in the received data memory region A of the SRAM 5.

Thus, as shown in FIG. 3, the received data memory regions A and B of the SRAM 5 are alternately used to store received data of one page after another therein. In the manner described above, received data of one page (=32 bytes) is stored once on the SRAM 5, and the operation for receiving data of first one byte in data of next one page is executed in parallel to the operation for writing, in the EEPROM 4, the data of preceding one page stored previously on the SRAM 5.

The above description has referred to the operation mode in which, after received data of one page is stored on the SRAM 5, the stored data of one page is written in the EEPROM 4 while data of first one byte in data of next one page is being received. However, when the write time $t_W$ for writing received data in the EEPROM 4 is shorter than that shown in FIG. 2, the received data may be written in the EEPROM 4 while data of next one byte is being received after the received data of one page is completely stored in the received data memory region A or B of the SRAM 5.

It will be seen from the relationship given by the expression (2) described previously that received data is completely written in the EEPROM 4 before other received data is completely written in the received data memory region A of the SRAM 5. Therefore, the received data memory regions A and B of the SRAM 5 can be similarly alternately used thereafter to successively write data therein, so that a large amount of data can be continuously transmitted and written without regard to the size of the communication buffer.

The data written in the manner described above may be an application program stored by down loading, or various kinds of registered data or the like.

In the aforementioned embodiment, two received data memory regions A and B are provided on the SRAM 5. However, depending on the relationship between the data transmission time and the write time required for writing data in the EEPROM 4, three or more received data memory regions may be provided on the SRAM 5. When such a plurality of received data memory regions are provided, data received earliest of all is first read out to be written in the EEPROM 4. Provision of such three or more received data memory regions is advantageous in that data can be reliably received and written in the EEPROM 4, even when the internal data write time $t_W$ of the EEPROM 4 is extended or the condition set forth in the expression (2) is not satisfied. In such a case, the aforementioned embodiment, in which data of preceding one page is written in the EEPROM 4 after received data of first one byte in data of next one page is written in the SRAM 5, may be modified, so that the data of preceding one page is written in the EEPROM 4, after writing of the data of preceding one page in the SRAM 5 is completed, and while data of next one page is being received.

In the aforementioned embodiment, received data of one byte after another is written in the SRAM 5. However, received data of a plurality of bytes selected as a unit may be written in the SRAM 5. The number of bytes that can be supplied as a unit is determined by the capacity of the internal register or the like of the I/o interface 2 or MPU 3 and also by the received data processing performance of the MPU 3. Therefore, the number of bytes may be selected to be a maximum, which permits independent reception and writing of transmitted data.

In the aforementioned embodiment, only one EEPROM 4 with a latch circuit is provided. However, a plurality of such EEPROM's may be provided. In such a case, the data receiving SRAM 5 may have a plurality of received data memory regions corresponding to the plural EEPROM's, so that data can be sufficiently distributed to the plural memory regions.

Further, although the SRAM and EEPROM are used in the embodiment of the present invention, by way of example, it is apparent that memories that can be used in the present invention are in no way limited to the SRAM and EEPROM.

I claim:

1. An IC card for storing information transmitted from an external terminal unit, comprising:
   a processor for dividing data of a plurality of bytes, transmitted from the external terminal unit, into a predetermined number of bytes;
   a first memory means for storing a system program;
   a second memory means for storing an application program; and
   a third memory means for storing the processed predetermined number of bytes to be written in said second memory means;
   said second memory means including a latch circuit for temporarily latching data of the predetermined number of bytes written from said third memory means, prior to another byte being stored in said third memory means, and an electrically erasable and programmable memory for receiving and storing data of the predetermined number of bytes written from said latch circuit, prior to another predetermined number of bytes being transmitted from said third memory means to the latch circuit, to thereby allow continuous receiving and storing of data in said IC card.

2. An IC card according to claim 1, wherein said second memory means includes said latch circuit and said electrically erasable programmable memory formed on a single IC chip.

3. An IC card according to claim 1, wherein said third memory means is a static random access memory (SRAM).

4. An IC card according to claim 3, wherein said first memory means is a mask read only memory (ROM).

5. An IC card according to claim 3, wherein said SRAM includes a plurality of communication buffers.

6. An IC card for receiving and transmitting data from and to an external terminal unit, comprising:
   a processor for dividing data of a plurality of bytes, transmitted from the external terminal unit, into a predetermined number of bytes;
   an interface for transferring data from the external unit to the processor;
   a first non-volatile memory means for storing a system program;
   a programmable second non-volatile memory means for storing at least one of an application program and registered data; and
   a programmable third memory means for storing the processed predetermined number of bytes;
   said second memory means being an EEPROM having a built-in latch circuit, and said third memory means being an SRAM, said latch circuit temporarily latching the predetermined number of bytes prior to another byte being stored in the programmable third memory means, and the EEPROM storing the predetermined number of bytes prior to another predetermined number of bytes being transmitted from the programmable third memory means to the latch circuit.

7. An IC card according to claim 6, wherein said SRAM includes a plurality of buffer memories.

8. An IC card according to claim 6, wherein said first memory means is a mask read only memory (ROM).

9. In an IC card including:
  a processor for dividing data of a plurality of bytes, transmitted from an external terminal unit, into a predetermined number of bytes;
  a first non-volatile memory means for storing a system program required for the operation of said processor;
  a programmable second non-volatile memory means for storing an application program, including registered data, said second memory means including a built-in latch circuit and specified memory locations to store information whose unit length is n bytes (n: being an integer larger than and including 2) and having an external information write time $t_1$ and a internal information write time $t_2$ (such that $t_2 > t_1$) required for writing information of the unit length;
  a third memory means, being one of a programmable non-volatile and volatile memory, for storing various kinds of processed data, said third memory means including a plurality of memory regions, each for storing information of the unit length and having an information time $t_3$ required for writing data of m bytes (m: being an integer smaller than n) in any one of said plural memory regions, the sum of said times $t_3$ and $t_1$ being selected to be less than or equal to the time required for receiving the data of m bytes, and the total time $t_4$ required for receiving the information of the unit length being given by the equation $t_4 \geq t_1 + t_2 + t_3$; and
  an interface for receiving and transmitting data from and to an external terminal unit;
  a method for writing information comprising the steps of:
    successively writing data of m bytes in one of said plural memory regions of said third memory means by said processor according to one of said system program and said application program in response to the reception of the data of m bytes among information transmitted from said external terminal unit;
    reading out, when the information of unit length has already been written in at least one of said plural memory regions of said third memory means, and the transmitted information of m bytes to be written is being received, the information of unit length stored earliest of all in said plural memory regions of said third memory means; and
    writing the information in said second memory means, wherein the latch circuit temporarily latches data of the predetermined number of bytes written from the third memory means, prior to another byte being stored in the third memory means, and specified memory locations which receive and store data of the predetermined number of bytes written from the latch circuit in specified memory locations, prior to another predetermined number of bytes being transmitted from the third memory means to the latch circuit.

10. An IC card according to claim 9, wherein said built-in latching circuit of said second memory means is for latching data of 32 bytes.

11. An IC card according to claim 10, wherein, when data to be written is transmitted from said external terminal unit together with a write command, data of n bytes is successively written in said specified memory locations in said second memory means.

12. In an IC card including:
  a processor for dividing data of a plurality of bytes, transmitted from an external terminal unit, into a predetermined number of bytes;
  a first non-volatile memory means for storing a system program required for the operation of said processor;
  a programmable second memory means for storing an application program and registered data, said second memory means including a latch circuit and specified memory locations to store information whose unit length is n bytes (n: being an integer larger than and including 2) and having an external information write time $t_1$ and an internal information write time $t_2$ (such that $t_2 > t_1$) required for writing information of the unit length;
  a third memory means, being one of a programmable non-volatile and volatile memory, for storing various kinds of processed data, said third memory means including a plurality of memory regions, each for storing information of the unit length and having an information write time $t_3$ required for writing data of m bytes (m: being an integer smaller than n) in any one of said plural memory regions, the sum of said times $t_3$ and $t_1$ being selected to be less than or equal to the time required for receiving the data of m bytes; and
  an interface receiving and transmitting data from and to an external terminal unit;
  a method for writing information comprising the steps of:
    successively writing data of m bytes in one of said plural memory regions of said third memory means by said processor according to one of said system program and said application program in response to the reception of the data of m bytes among information transmitted from said external terminal unit; and,
    reading out, when the information of unit length has already been written in at least one of said plural memory regions of said third memory means, and the transmitted information of m bytes to be written is being received, the information of unit length stored already in said memory region of said third memory means; and
    writing the information in said second memory means, wherein the latch circuit temporarily latches data of the predetermined number of bytes written from the third memory means, prior to another byte being stored in the third memory means, and specified memory locations which receive and store data of the predetermined number of bytes written from the latch circuit in specified memory locations, prior to another predetermined number of bytes being transmitted from the third memory means to the latch circuit.

* * * * *